Sept. 11, 1962     W. R. SAIDEL ET AL     3,053,152
APPARATUS AND PROCESS FOR MAKING OPEN-TOP CONTAINERS
Filed Feb. 20, 1959     14 Sheets-Sheet 1

Sept. 11, 1962   W. R. SAIDEL ET AL   3,053,152
APPARATUS AND PROCESS FOR MAKING OPEN-TOP CONTAINERS
Filed Feb. 20, 1959   14 Sheets-Sheet 3

Fig. 3

INVENTORS.
William R. Saidel,
Dean P. Selock &
Curtis M. Lee.
By:
Owen, Mecklenburger, van Holst, Pendleton & Neuman. Attys.

Sept. 11, 1962    W. R. SAIDEL ET AL    3,053,152
APPARATUS AND PROCESS FOR MAKING OPEN-TOP CONTAINERS
Filed Feb. 20, 1959    14 Sheets-Sheet 7

INVENTORS.
William R. Saidel,
Dean P. Selock &
Curtis M. Lee.

Sept. 11, 1962 W. R. SAIDEL ET AL 3,053,152
APPARATUS AND PROCESS FOR MAKING OPEN-TOP CONTAINERS
Filed Feb. 20, 1959 14 Sheets-Sheet 12

Sept. 11, 1962 W. R. SAIDEL ET AL 3,053,152
APPARATUS AND PROCESS FOR MAKING OPEN-TOP CONTAINERS
Filed Feb. 20, 1959 14 Sheets-Sheet 13

INVENTORS
William R. Saidel
Dean P. Selock &
Curtis M. Lee.

United States Patent Office 3,053,152
Patented Sept. 11, 1962

3,053,152
APPARATUS AND PROCESS FOR MAKING OPEN-TOP CONTAINERS
William R. Saidel, Park Forest, Dean P. Selock, Chicago, and Curtis M. Lee, Park Forest, Ill., assignors to Machinery Development Corporation, Chicago Heights, Ill., a corporation of Illinois
Filed Feb. 20, 1959, Ser. No. 794,643
7 Claims. (Cl. 93—51)

This invention relates to an open-top container and apparatus and process for making same from a blank of relatively stiff, bendable sheet material such as, for example, thin-gauge aluminum foil or laminated foil. Such container is particularly suitable for the packaging of frozen foods or the like.

Various containers of this general type have heretofore been proposed which, however, because of design, are difficult and costly to fabricate, not readily capable of automatic fabrication, and/or are not possessed of sufficient strength to withstand normal handling either prior to or subsequent to the container being filled.

In the packaging of comestibles, particularly frozen foods, it is essential that the container be leakproof, not in any way deleteriously affect its contents, be capable of withstanding a wide range of temperatures, and be attractive in appearance, light in weight, and of compact size. The use of aluminum sheet material for this type of container has proven most desirable, yet when the gauge is approximately .0035", extreme difficulty has been encountered in fabricating therefrom a container possessed of the necessary requirements, without tearing or rupturing of the material. Furthermore, when utilizing this gauge material, reinforcing of portions of the container was found necessary, which complicated and increased materially the cost of fabrication.

Thus, it is one of the objects of this invention to provide an open-top container which is formed from thin-gauge metallic sheet material and is not possessed of any of the shortcomings aforenoted.

It is a further object of this invention to provide an apparatus and process which automatically and expeditiously fabricates an open-top container from a blank of thin-gauge sheet material.

Further and additional objects will appear from the description, accompanying drawings, and appended claims.

In accordance with one embodiment of this invention, an open-top container is provided which is formed from thin-gauge, relatively stiff, sheet material. The container includes a substantially flat bottom section of a single thickness of material and having a polygonal configuration. Integral with the periphery of the bottom section, and extending upwardly therefrom, are side sections which cooperate with one another to delimit said bottom section. At the junctures between adjacent side sections are formed collapsed pockets which have like portions thereof of two-ply thickness disposed in overlapping relation with respect to the outer surface of the segments of the side sections juxtaposed the junctures. The upper edge portions of the side sections of the container are folded outwardly and downwardly into overlapping relation with respect to the collapsed pocket portions and the remainder of the side sections so as to form a marginal edge of at least two-ply thickness of material.

For a more complete understanding of this invention, reference should be made to the drawings, wherein:

FIG. 24 is an enlarged fragmentary top plan view of FIG. 9, having a portion thereof cut away;

Referring now to the drawings and more particularly to

Figures 22, 23:
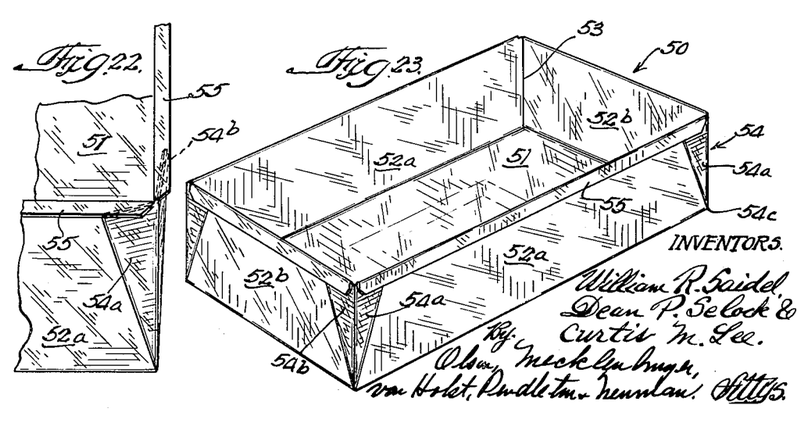
FIG. 23 is a perspective view of the improved container.
Figure 25:
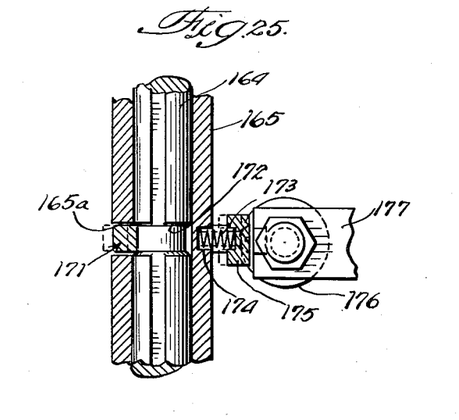
FIG. 25 is an enlarged fragmentary sectional view taken along line 25—25 of FIG. 24.

FIG. 23, an improved open-top container 50 is shown which is adapted to be formed of aluminum sheet material such as, for example, .0035" thickness and of H-1 hardness. It is to be understood, of course, that laminated sheet material or the like may be readily used as the material from which the container is to be formed. The container 50 is of a type suitable for the packaging of comestibles such as frozen vegetables, fruits, bakery products, and the like.

The container, as shown in FIG. 23, is of a rectangular configuration; however, it is to be readily understood that the container is not limited to this precise shape. Container 50, in this instance, has a flat bottom section 51 which is of rectangular configuration. Integral with the peripheral edges of bottom section 51 are side sections 52a and 52b, which are disposed in upright relation and cooperate with one another to delimit the bottom section 51. Side sections 52a, in this instance, are integral with the longer side edges of bottom section 51 and side sections 52b are integral with the shorter side edges of the bottom section. The junctures 53, formed between the cooperating side sections 52a and 52b, and which are disposed at the corners of bottom section 51, are reinforced by pocket portions 54 which, in this instance, are in the form of collapsed pyramidic pockets. The pockets 54 in collapsed condition form like segments 54a and 54b which overlap the outer surfaces of the segments of the side sections 52a and 52b, respectively, juxtaposed such junctures. The segments 54a and 54b are triangular in shape and have one of the apexes 54c thereof terminating at the plane of bottom section 51. The segments 54a and 54b have a common side which is coincident to the juncture 53. Segments 54a and 54b are of two-ply thickness of material and conform substantially to the outer surface configuration of side sections 52a and 52b, respectively. The upper marginal edge portions 55 of the side sections 52a and 52b are bent outwardly and downwardly into overlapping relation with portions of segments 54a and 54b and side sections 52a and 52b, thereby providing reinforcement for the upper edge of the container and effecting retention of segments 54a and 54b in overlapping position with respect to side sections 52a and 52b.

The method of forming the container 50 will be discussed in detail in the description to follow hereinafter.

Figure 1:
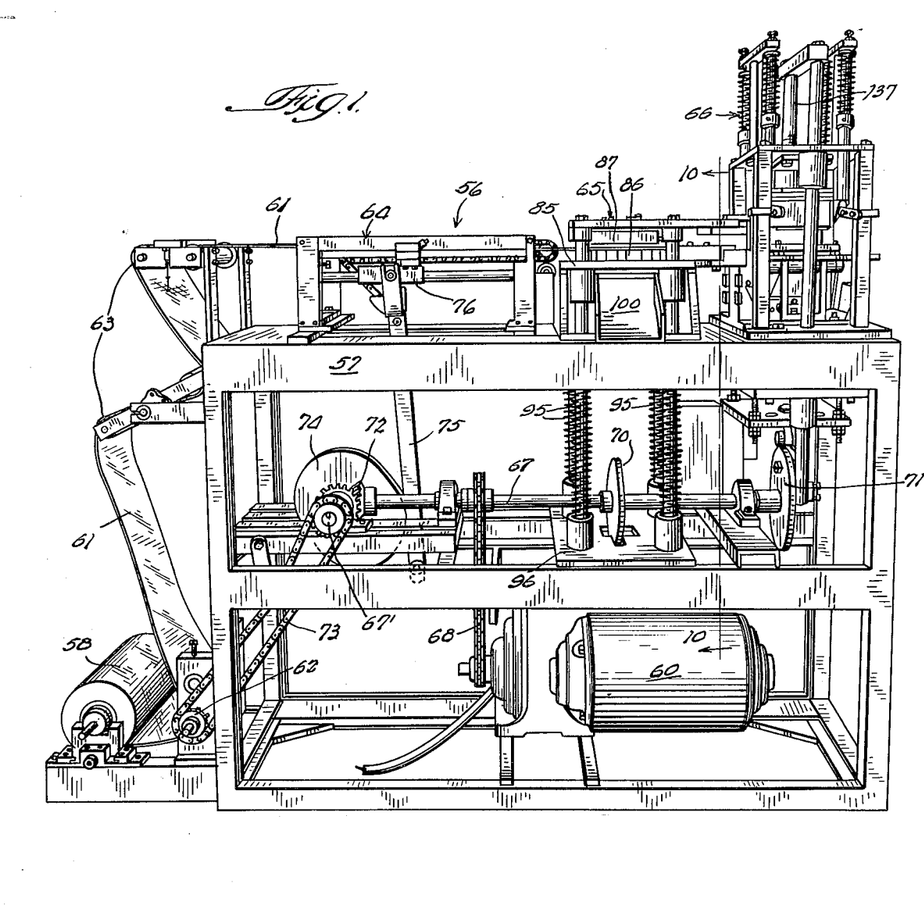
FIGURE 1 is a fragmentary perspective side view of one form of an apparatus for fabricating the improved open-top container.
Figure 2:
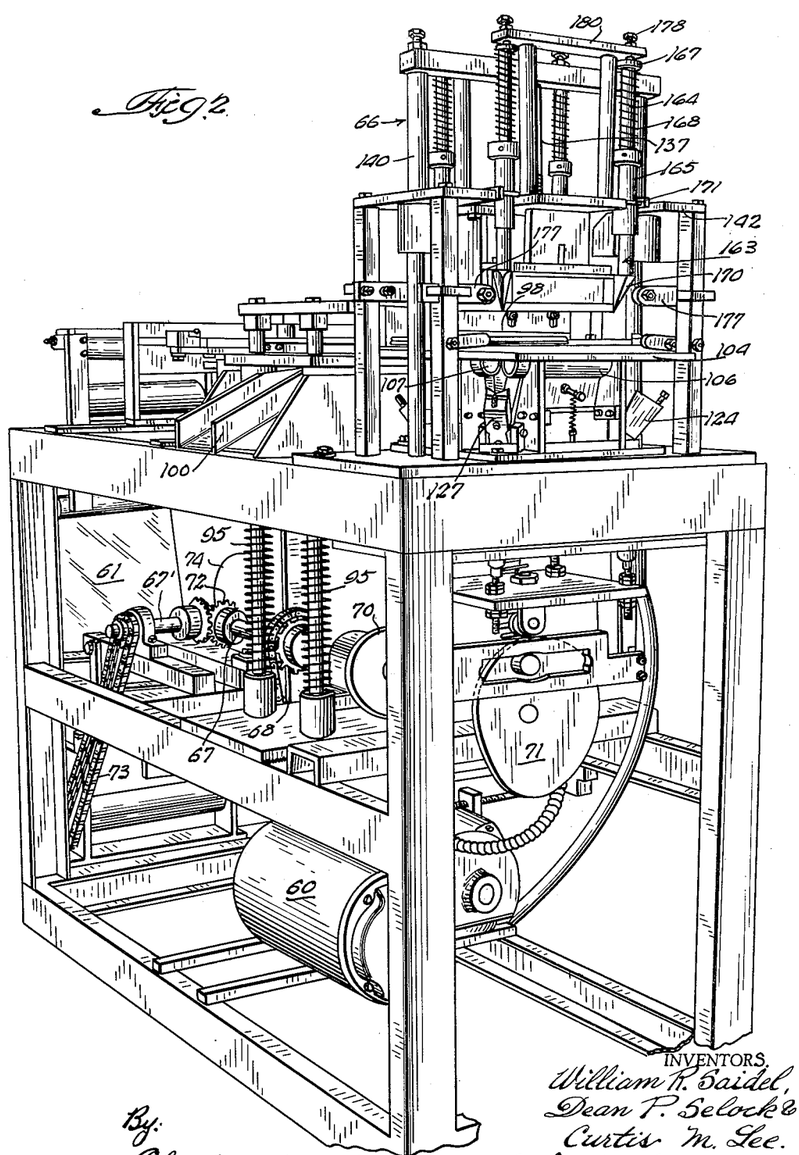
FIG. 2 is an enlarged fragmentary perspective right end view of the apparatus shown in FIG. 1 and with the forming dies thereof disposed in an inoperative relation.

Referring to FIGURE 1, one form of an apparatus 56 is shown for automatically fabricating the container 50 shown in FIG. 23. Basically, apparatus 56 comprises an elongated frame 57, at the lower end of which is disposed a rolled stock 58 of sheet material from which the container 50 is formed. Positioned within the lower portion of frame 57 is a power source 60 for actuating the various parts of the apparatus in a sequence to be hereinafter discussed.

A web 61 of sheet material is unrolled from stock roll 58 by a driven roller 62 or is pulled by the action of the web-feed and indexing mechanism 64, to be hereinafter described. The web 61 is passed over a plurality of decurling rollers 63, mounted on one end of frame 57, until the web is disposed in a substantially horizontal plane above the top surface of frame 57.

In the form of the apparatus shown in FIG. 1, there is mounted on the top surface of frame 57, in longitudinally spaced-in-line relation, a web-feed and indexing mechanism 64, web-notching and severing mechanism 65, and blank-forming mechanism 66. In the modified form of the apparatus shown in FIG. 26, the arrangement of the aforementioned mechanisms is slightly changed, in that the notching and severing mechanism 65 has been formed into two separate mechanisms 65' and 65". Mechanism 65' is directed only to the function of notching the web and is positioned ahead of the web-feed and indexing mechanism 64, and mechanism 65" is directed only to severing a blank from the web and is positioned behind or following mechanism 64. The order in which these mechanisms are arranged on the top surface of frame 57 corresponds to the sequence of operations followed in the fabrication of container 50.

Apparatus

Disposed within frame 57 above power source 60, is a drive shaft 67 which is drivingly connected thereto by a chain belt 68. Keyed on shaft 67 and in longitudinal spaced relation with respect to one another, are cams 70 and 71, the function of which will be described hereinafter. To one free end of drive shaft 67 is keyed a beveled gear 72 which imparts power to a second transversely disposed shaft 67' and the power therefrom transmitted through a chain belt 73 to the roller 62, the latter effecting unrolling of the web 61 from the stock roll 58. Beveled gear 72 likewise imparts rotational movement to a cam 74, keyed on shaft 67', which cooperates with a follower arm 75 to operate the web-feeding mechanism 64 (see FIGS. 15 and 16). As aforeindicated, roller 62 may not be power-driven, in which case the feed of the web from the stock roll 58 is accomplished solely by the pulling action exerted on the web by web-feed and indexing mechanism 64, to be hereinafter more fully described. With this latter arrangement, the apparatus may be of simpler construction.

Web-Feeding Mechanism

Figure 15:
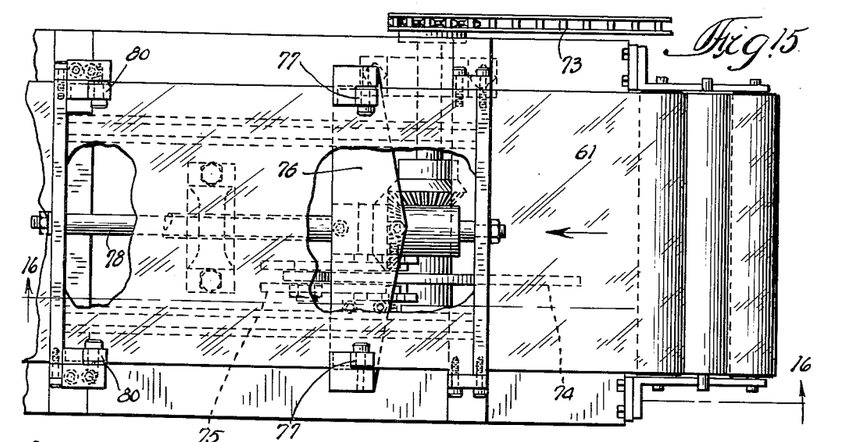
FIG. 15 is an enlarged fragmentary top plan view of the mechanism forming a part of the apparatus shown in FIG. 1, for feeding a web of sheet material from a stock roll of such material; portions of the mechanism having been partially cut away.
Figure 16:
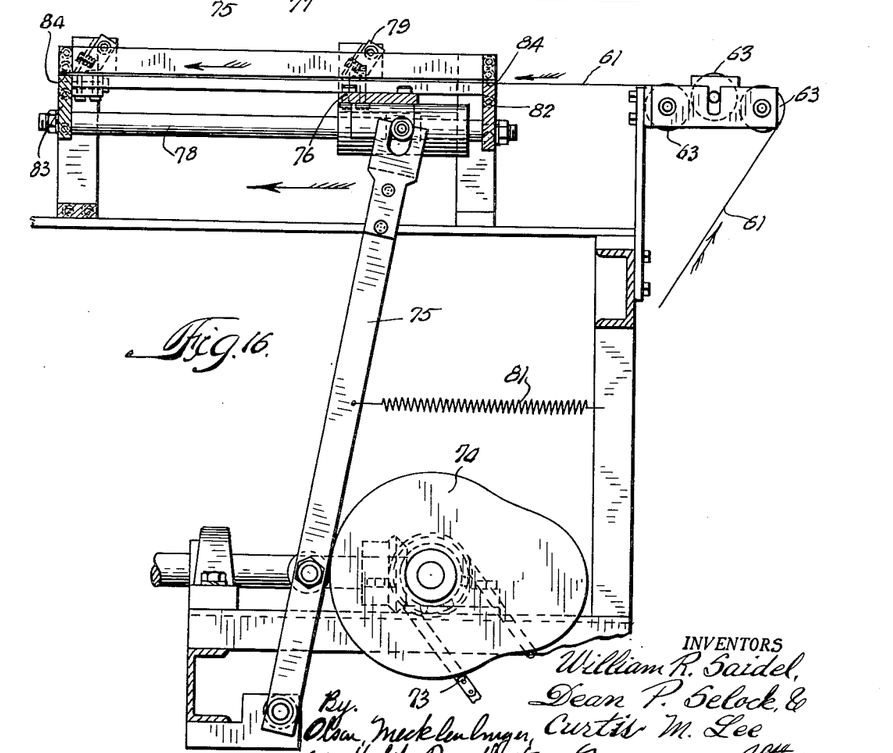
FIG. 16 is a sectional view taken along line 16—16 of FIG. 15.

To the upper end of follower arm 75 is adjustably affixed a carrier piece 76 which forms a part of mechanism 64. Carrier piece 76 is disposed beneath web 61, when the latter is in a horizontal position and, as shown more clearly in FIGS. 15 and 16, there are pivotally mounted at opposite ends of carrier piece 76, upright dogs 77 under which the web 61 is caused to pass. The dogs 77 are provided with biased pawls 79 which frictionally engage the marginal edges of the web, while carrier piece 76 is moving along the guide bar 78 in a direction toward the left, as seen in FIG. 15. Disposed adjacent the left end of guide bar 78 is a second set of dogs 80 which grip the marginal edges of the web 61 and hold the same fast while the carrier piece 76 is returning to the position shown in FIG. 15. Thus, the speed and length of movement of the carrier piece 76 is dependent upon the peripheral configuration of cam 74 and the speed or rotation thereof. The follower arm 75 is held in continuous engagement with the periphery of cam 74 by spring 81 (see FIG. 16).

Guide bar 78 is supported in a substantially horidontal position by cross-brace members 82 and 83 which, in turn, are secured to the frame 57. Each member 82 or 83 is provided with a slit 84 through which the web passes.

Notching and Severing Mechanism

Figure 10:
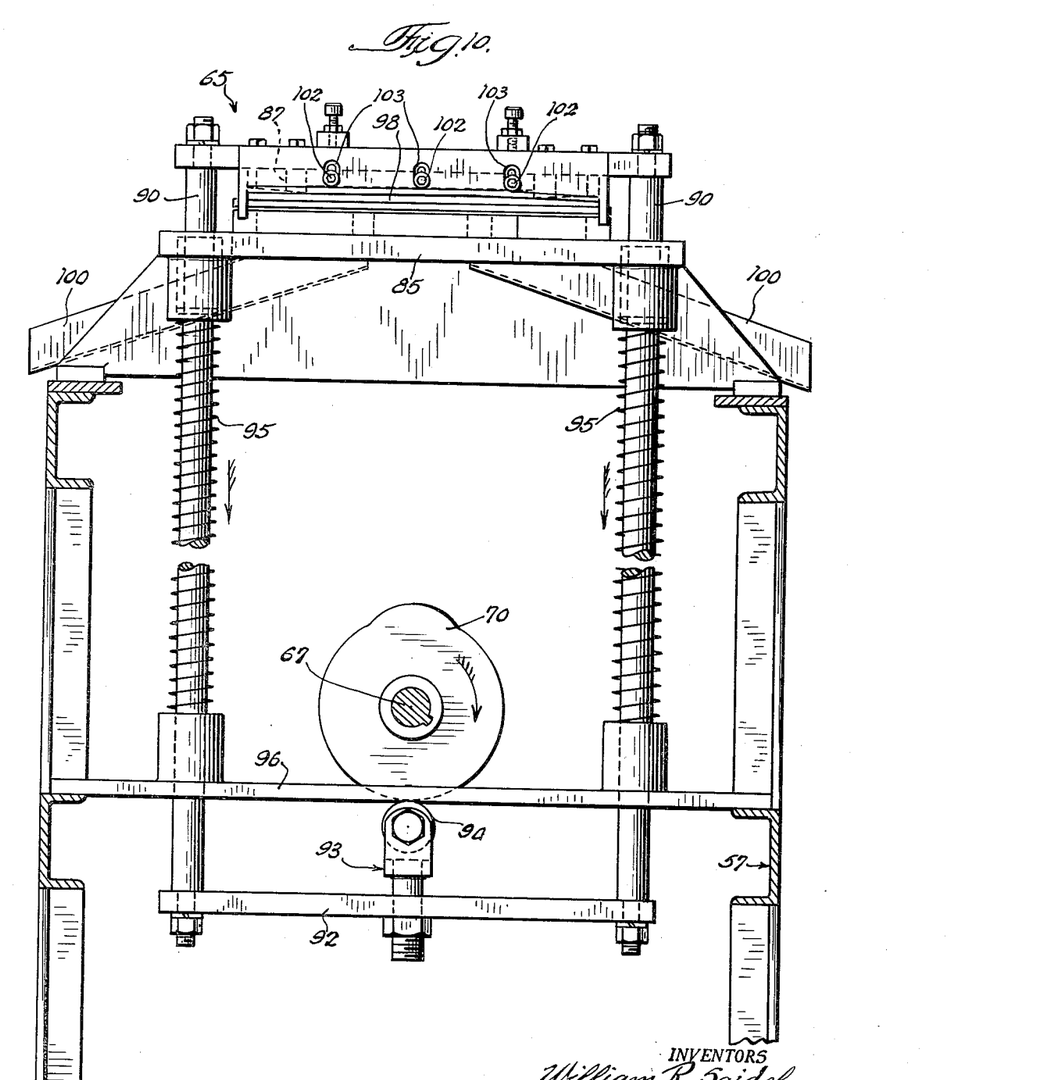
FIG. 10 is an enlarged fragmentary sectional view taken along line 10—10 of FIG. 1.
Figures 11, 12, 13:
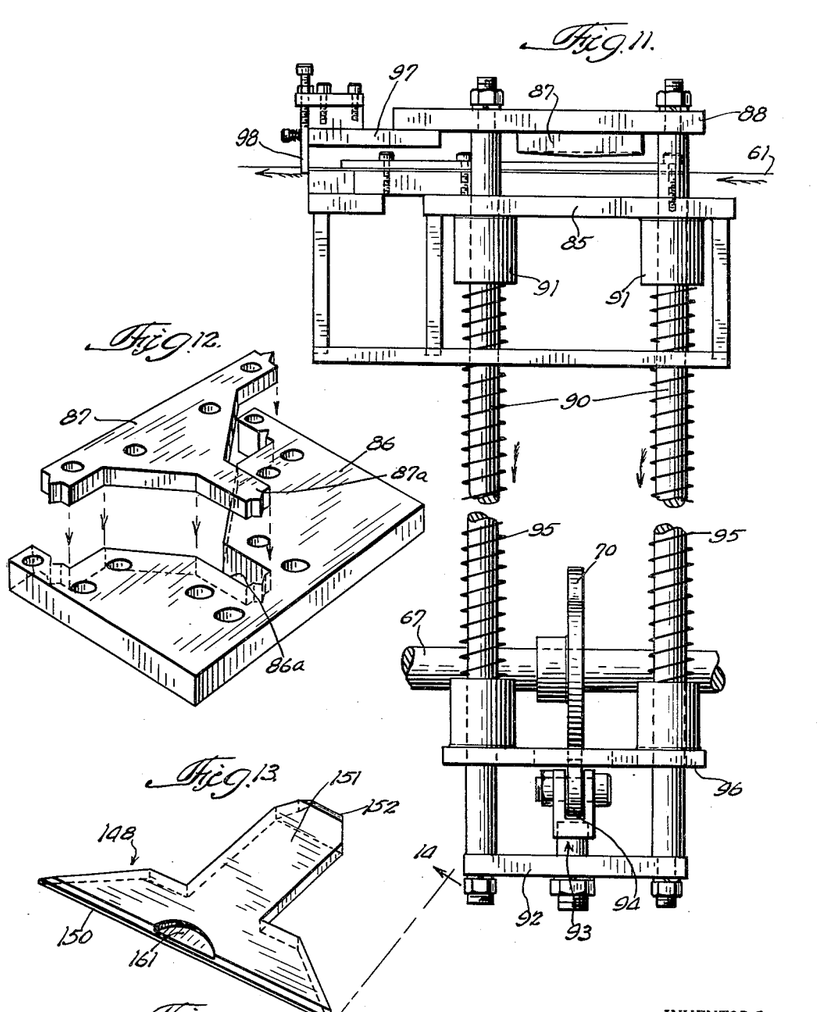
FIG. 11 is a fragmentary left side elevational view of FIG. 10.
FIG. 12 is an enlarged perspective view of one set of notching dies shown in FIG. 11.
FIG. 13 is an enlarged perspective view of one of the forming plates carried by the mandrel for effecting outward lateral bending of the upper marginal edge portions of the side sections of the container.
Figure 14:
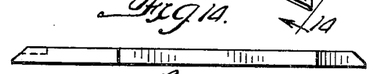
FIG. 14 is an elevational view of the forming plate taken along line 14—14 of FIG. 13.

The notching and severing mechanism 65, as seen more clearly in FIGS. 10-12, comprises a stationary platform 85 on which are mounted relatively spaced female dies 86, utilized in notching the marginal edges of web 61. Two sets of notching dies are mounted in aligned relation on platform 85. The alignment of such die sets is transverse to the direction of travel of the web, shown by arrows in FIG. 11.

Figure 17:
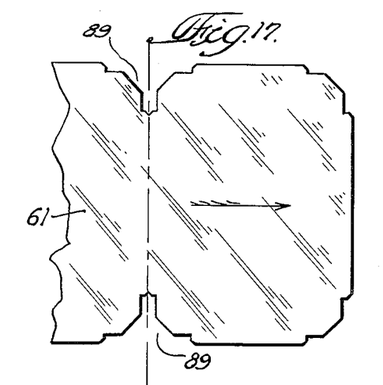
FIG. 17 is a fragmentary plan view of the web of sheet material subsequent to the marginal edges thereof being notched.

The male or movable die 87, cooperating with the female die 86, is mounted on a second platform 88 which is movable toward and away from platform 85. Depending from platform 88 are a plurality of shafts or studs 90 which extend through corresponding openings 91 formed in platform 85. The shafts 90 are symmetrically arranged on platform 88 and have the lower ends thereof interconnected by a piece 92 which is positioned within the frame 57 of the apparatus. Mounted on piece 92, and projecting upwardly therefrom, is a follower 93 having a roller 94 in contact with the periphery of cam 70 which, as heretofore mentioned, is keyed to drive shaft 67. To maintain positive contact between roller 94 and the periphery of cam 70, there is provided a coil spring 95 for each shaft 90. Each coil spring has one end thereof abutting platform 85 and the other end thereof contacting a spacer piece 96 which interconnects all of the shafts 90 and moves as a unit therewith. The peripheral deformity of cam 70 effects reciprocatory movement of platform 88. When the platform 88 is depressed to its fullest extent by cam 70, the inward projection 87a formed on male die 87 is accommodated in a suitable recess or pocket 86a formed in female die 86, thereby resulting in the web 61 being provided with notches 89 formed in the marginal edges thereof (see FIG. 17). Mounted on frame 57, adjacent the notching dies 86 and 87, are a pair of chutes 100, which are adapted to direct the scraps cut from the web into a suitable receptacle, not shown.

Figure 18:
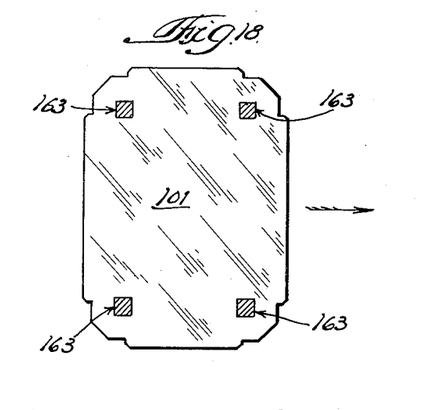
FIG. 18 is a top plan view of the blank of sheet material subsequent to being severed from the web by a cutting blade, forming a part of the apparatus, the relative location of the dies for forming pockets at the junctures of the side sections of the container being diagrammatically shown.
Figure 19:
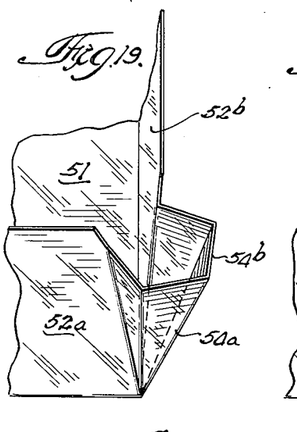
FIGS. 19–22 are enlarged fragmentary perspective views of a corner of the improved container in various stages of being formed.

Projecting from the trailing edge of platform 88 and being movable therewith, is an extension 97 on which is mounted a cutter blade 98 (see FIG. 11). The cutter blade 98 spans the width of the web 61 and is so aligned therewith that it effects severing of the web along a line interconnecting the innermost or base portions of the notches 89; the line of cut is shown in dotted lines in FIG. 17. The cutter blade, when moved downwardly to its fullest extent, causes a blank 101 (see FIG. 18) to be formed from web 63. The cutter blade 98, as shown in FIG. 10, may be adjusted relative to extension 97, to compensate for wear on the blade by adjusting screws 102 which extend through suitable slots 103 formed on the upper portion of the blade 98.

Figures 26, 27, 28:
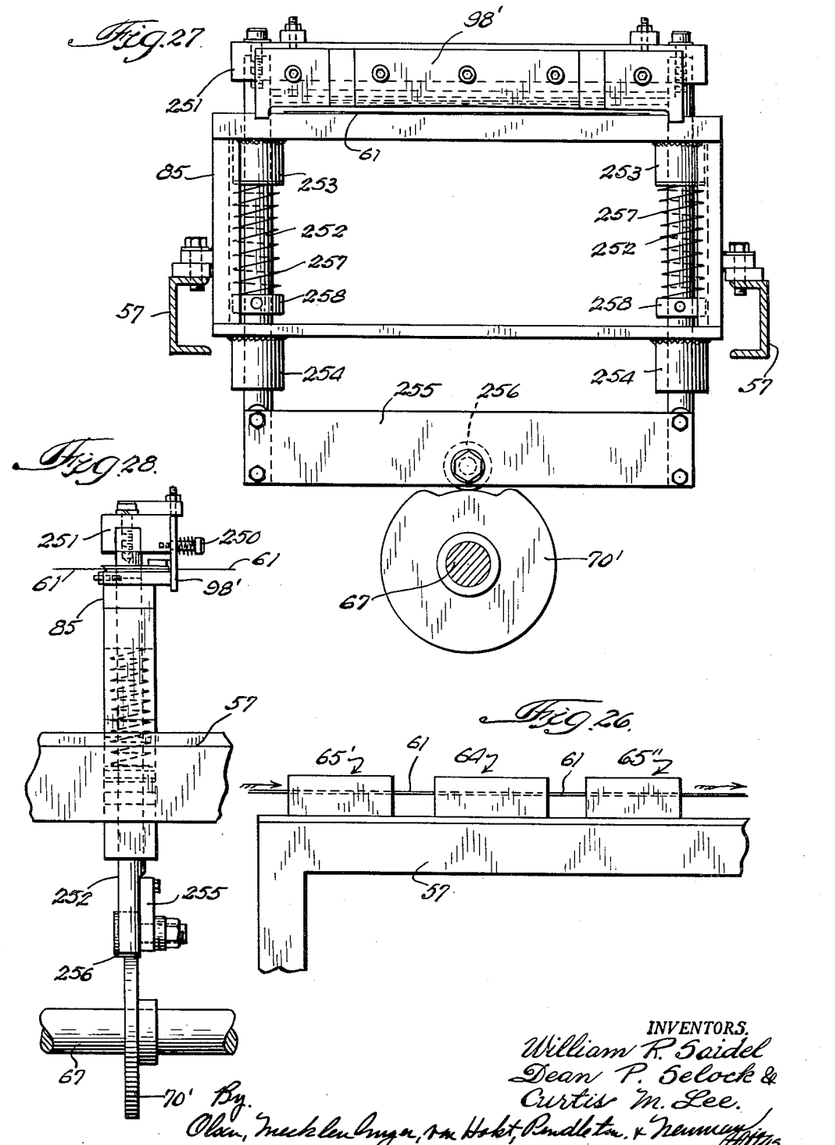
FIG. 26 is a fragmentary diagrammatic view of a modified form of the apparatus, showing the relative positioning of the notching dies, feed mechanism, and cutting mechanism on the frame.
FIG. 27 is an enlarged fragmentary vertical sectional view of the cutting mechanism taken along line 27—27 of FIG. 26.
FIG. 28 is a left side elevational view of FIG. 27.

In the modified form of the apparatus, shown in FIG. 26, the notching and severing mechanism 65 has been divided into two separate mechanisms 65' and 65". Mechanism 65' is identical in construction to mechanism 65, aforedescribed, except that the cutter blade 98 is no longer attached to the trailing edge of platform 88 by extension 97. In place thereof there is provided a separate cutter blade mechanism 65", shown in detail in FIGS. 27 and 28. It will be noted in FIG. 26 that notching mechanism 65' has been transposed on the top surface of frame 57 to a position ahead of web-feed and indexing mechanism 64. Thus, in the modified form of the apparatus, the location of cam 70 on shaft 67 will be disposed to the left of bevel gear 72 or, in the alternative, a small stub shaft, not shown, coaxial with shaft 67 could project to the left of shaft 67', as seen in FIG. 1, and be provided with a bevel gear similar to gear 72, so as to enable power to be transmitted to such stub shaft.

The cutting bar mechanism 65" (see FIGS. 27 and 28) is provided with a cutter bar 98' similar to that described in reference to FIG. 11, which is adapted to span the width of the web passing therebeneath. The bar 98' is adjustably secured by a plurality of anchoring bolts 250 to an elongated block piece 251, the latter having depending from opposite ends thereof studs 252, which are slidably disposed in suitable bearings 253 and 254 formed on platform 85 carried on frame 57. The lower ends of studs 252 are interconnected by a cross-piece 255 which carries a follower 256 at approximately its midpoint. Follower 256 contacts continuously the periphery of a cam 70' which is keyed to shaft 67 and is of such shape as to impart the same reciprocatory motion to the bar 98' as is imparted to the movable notching die 87 by the transposed cam 70. Encompassing each stud 252 is a coil spring 257, the upper end of which bears against bearing 253 and the lower end of which bears against a collar 258 fixed on the stud above bearing 254. The springs 257 insure that follower 256 is in constant engagement with the periphery of cam 70'.

The advantage to be derived from the arrangement of the mechanisms 65', 64, and 65" in the modified apparatus shown in FIG. 26, is that where the web material is readily susceptible to buckling, the likelihood of such buckling occurring might be minimized because of the closer proximity of the carrier piece 76 of the feed mechanism 64 to the cutter bar 98' and, consequently, a shorter segment of the web being disposed between carrier piece 76 and cutter bar 98'.

Forming Section

Once the blank is formed by the cutter blade 98, the blank is in position for being accommodated by the forming section or mechanism 66 of the apparatus. Section 66 is provided with a base 104, on the upper surface of which the blank 101 is disposed. The base upper surface is substantially coplanar or slightly below the upper surface of platform 85. Base 104 is provided with an opening 105 which delimits the forming pocket and, in this instance, is substantially rectangular in form and is overlain by the blank 101. Disposed within the opening 105, and in substantially parallel relation with respect to the sides thereof, are pairs of elongated rollers 106 and 107. The outer periphery of each roller is substantially tangential with respect to the plane of surface 104. The function of these rollers 106 and 107 will be described more fully hereinafter. The rollers are maintained in a substantially horizontal plane by upright supports 108, which are secured to the frame 57.

Disposed within opening 105, and delimited by rollers 106 and 107, is a platform 110 which is adapted to be retracted or depressed relative to base surface 104. Symmetrically arranged on platform 110, and depending therefrom, are a plurality of shafts 111 having the lower ends thereof slidably extending through a stationary platform 112 and terminating at the underside thereof. The platform 110 is biased to assume a position wherein the upper surface thereof is coplanar with the upper surface of base 104, by means of coil springs 113, one disposed in encompassing relation with each depending shaft 111. The shafts 111 and corresponding coil springs 113 extend through suitable openings 114 formed in a stationary cross-member 115 secured to frame 57.

Figure 7:
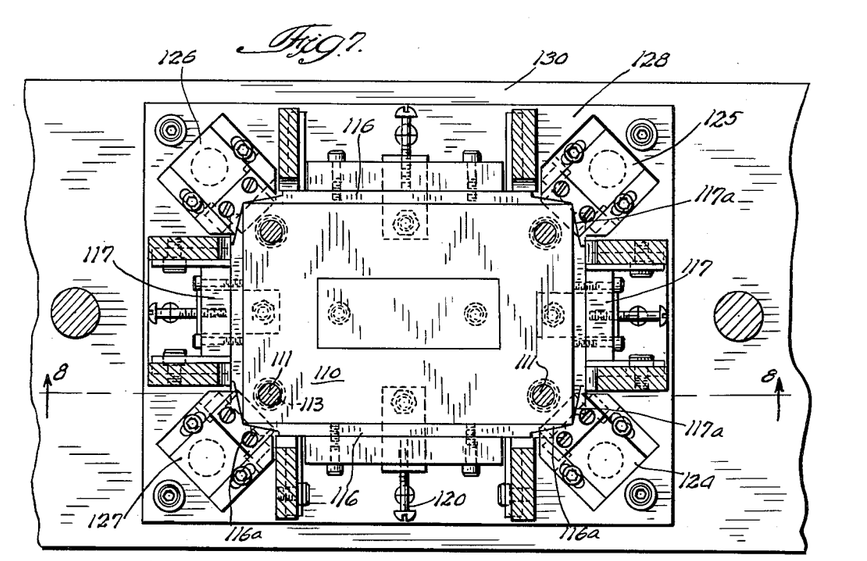
FIG. 7 is an enlarged fragmentary sectional view of the forming pocket, taken along line 7—7 of FIG. 5.
Figure 8:
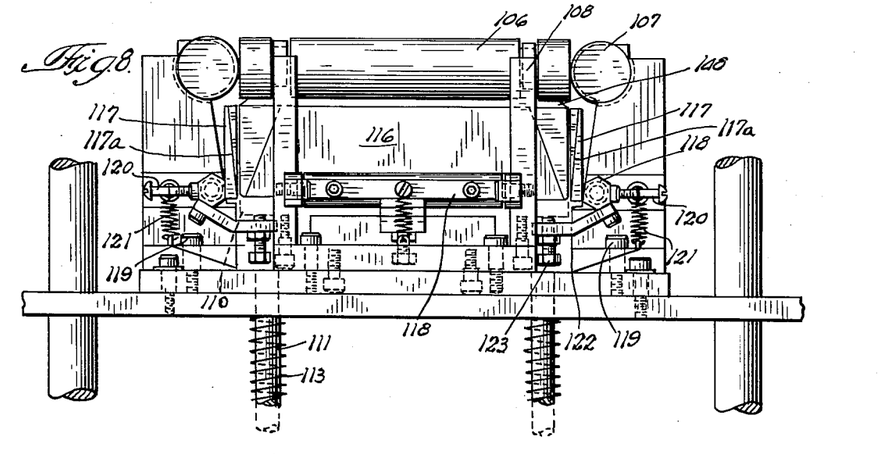
FIG. 8 is a sectional view taken along line 8—8 of FIG. 7.
Figure 9:
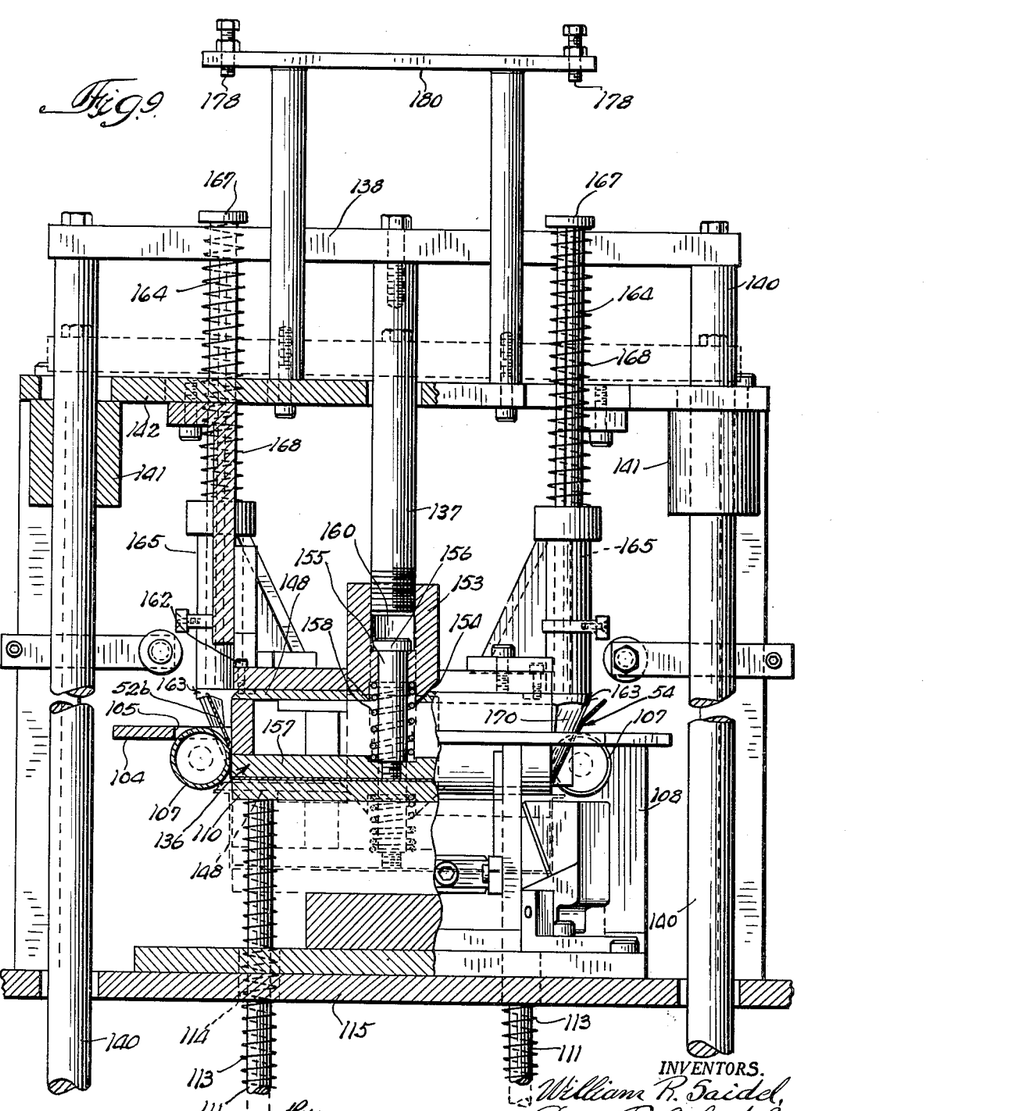
FIG. 9 is an enlarged fragmentary elevational view of the forming dies with the mandrel partially extending into the forming pocket; portions of the latter have been broken away; the mandrel, when in its lower terminal position with respect to the forming pocket, is shown in dotted lines.

As seen in FIG. 7, platform 110 is of a shape corresponding to the shape of the bottom section 51 of the container 50. When the platform 110 is in its fullest retracted position, as shown in dotted lines in FIG. 9, such platform is delimited by a plurality of pivotal side plates 116 and 117, which assume a substantially vertical position and cooperate with retracted platform 110 to define the blank-forming pocket. As seen in FIG. 8, each plate 116 or 117 is adapted to pivot about an axle piece 118 which is disposed parallel to the lower elongated edge of the plate. Each axle piece 118 has the opposite ends thereof journalled in the roller supports 108, as seen more clearly in FIG. 8. Extending angularly outwardly from approximately the midpoint of each axle piece is a finger 120, to which is secured a spring 121, the lower end of which is secured to a stationary member and thus tends to cause the plate to pivot about axle piece 118 in such a manner that the upper edge of the plate 116 or 117 moves away from the periphery of platform 110. As seen in FIG. 7, the opposite outer edges 116a and 117a are tapered, for a purpose to be described more fully hereinafter.

Also secured to axle piece 118 is a second finger 122, which has affixed to the free end thereof an adjustable contact 123. The contact 123 is disposed within the path of movement of platform 110 and is engaged by the underside of such platform just prior to the latter reaching its fully depressed position and thus pivotally actuates the plate into a vertical position, as shown in FIG. 7.

Figure 6:
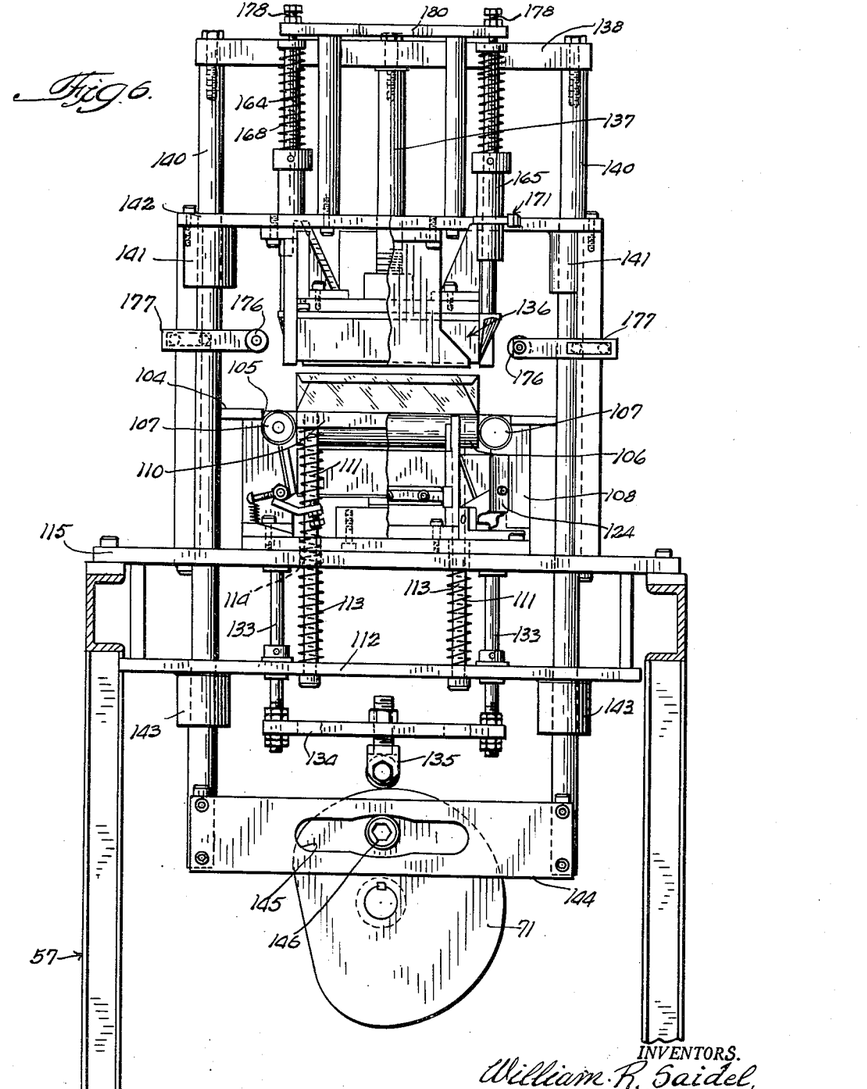
FIG. 6 is an enlarged fragmentary right end elevational view of the apparatus shown in FIG. 1, with the mandrel thereof fully retracted and the formed container discharged from the forming pocket.

Upon platform 110 returning to its upper terminal position, as shown in FIG. 6, the second finger 122 of each axle piece 118 is disengaged, whereby coil spring 121 will pivot the plate 116 or 117 about the axle piece until the finger 122 abuts an adjustable stop 119 mounted on a stationary member 128.

Pivotally mounted on member 128, at the junctures formed between plates 116 and 117, are corner-forming blocks 124, 125, 126 and 127 (see FIG. 7). Base 128 is mounted on a cross-frame piece 130 by a plurality of anchor bolts or the like.

Figure 5:
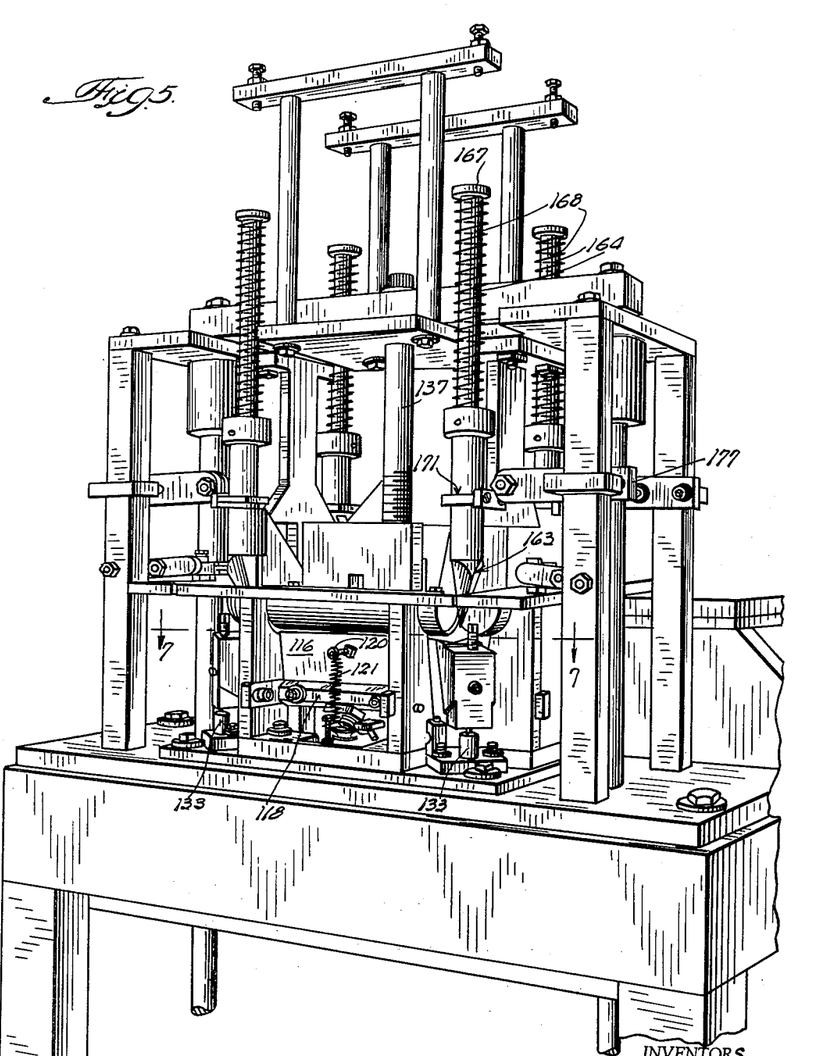
FIG. 5 is similar to FIG. 4, but showing the mandrel fully extended into the forming pocket, whereby the bottom section, side sections, and collapsed corner pockets of the container are fully formed and the upper marginal edges of the side sections bent laterally outwardly.
Figure 20:
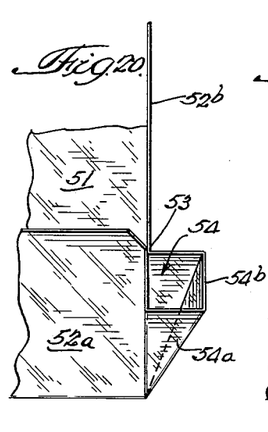

Each forming block has a die piece 131 mounted on the face thereof adjacent the platform 110. The die piece, in this instance, has a substantially V-shaped recess 132 formed therein which is adapted to accommodate two adjoining sides of the pocket 54 formed in the blank, as shown in FIG. 20, during a predetermined period of fabrication thereof. The blocks are simultaneously actuated into a vertical position, as shown in FIG. 5, by a plurality of plungers 133 which extend through suitable openings formed in base 128 and contact the undersides of the blocks. All of the plungers 133 have the lower ends thereof interconnected by a carrier 134 so as to effect unitary motion of the plungers. A follower 135 depends from carrier 134 and is in rolling engagement with the periphery of flange 71, the latter being keyed to shaft 67.

Figure 21:
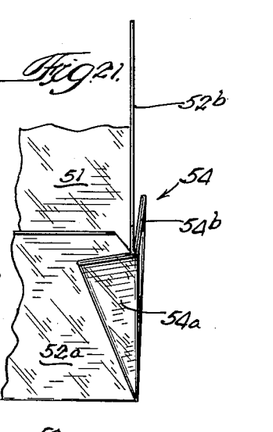

When the blocks 124–127 are moved to the position shown in FIG. 5, the pyramidic pockets 54 formed in the blank (see FIG. 20), are collapsed to the position as shown in FIG. 21, so that like triangular-shaped segments 54a and 54b of the pocket, which are of double thickness, will overlie corresponding portions of the side sections 52a and 52b of the container and thus result in the corners of the container being reinforced by three-ply construction.

Cooperating with retractable platform 110 is a mandrel or plunger 136, which is mounted above platform 110 and is adapted to cooperate with the forming pocket aforedescribed, to form the container 50. The mandrel 136 is provided with a centrally disposed upwardly extending shaft 137 which has the upper end thereof affixed to a yoke 138. Depending from the underside of yoke 138 are shafts 140 (see FIG. 6), which extend through a first set of suitable bearings 141 formed in a stationary member 142, through cross-member 115, and through a second set of bearings 143 affixed to stationary platform 112. The lower ends of shafts 140 are interconnected by member 144, so that the shafts move as a unit in a vertical plane. Member 144 is provided with an elongated slot 145, in which is disposed a pin 146 carried on the face of cam 71. Thus, upon rotation of cam 71, vertical reciprocatory movement is imparted to shafts 140 and carrier 138. Carried on the upper side of mandrel 136 are a plurality of plates 148 which are adapted to move outwardly from the periphery thereof and effect binding over of the upper marginal edges 55 of the container, so as to effect formation of the reinforced edge of the container, as shown more clearly in FIGS. 22 and 23. In this particular instance, there are four plates 148, all of similar construction (see FIG. 13). Each plate has an elongated tapered edge 150 which is disposed adjacent the periphery of mandrel 136 and is adapted to contact the upper marginal edge 55 to effect outward bending of such edge at a predetermined time.

Formed on plate 148 is an inwardly extending finger 151 terminating in a tapered edge 152. Edge 152 is tapered so as to accommodate a wedge-like connector 153 which is affixed to the lower end of mandrel shaft 137 (see FIG. 9). Connector 153 has a tapered lower edge 154 which engages tapered edges 152 of plates 148 and, upon downward movement of the connector 153, causes outward spreading or movement of the plates 148, so that the outer tapered edges 150 thereof extend beyond the periphery of mandrel 136. The tapered edges of plates 148 contact the rollers 106 and 107 as the mandrel moves upwardly from the position shown in dotted lines in FIG. 9, to the position shown in FIG. 6, and thus effect retracting of the plates 148 into the mandrel 136.

Carried within connector 153 is a stud 155 which has the lower edge thereof affixed to the bottom section 157 of mandrel 136. The upper end of stud 155 is provided with an enlarged head 156 which is disposed within an elongated pocket 160 formed within connector 153 (see FIG. 9). The head 156 is biased to engage a shoulder at the bottom of pocket 160 by a coil spring 158 which encompasses stud 155 and has one end thereof abutting the bottom section 157 of mandrel 136 and the upper end thereof contacting a countersunk opening formed in the underside of connector 153. Thus, upon mandrel 136 reaching the lower terminus of its downward movement, continued downward movement of the carriages 138 will cause the connector 153 to continue its downward movement without effecting further downward movement of bottom section 157 and thus result in outward spreading of plates 148. As seen in FIG. 13, the upper outer surface of each plate 148 is provided with a recess 161 in which is accommodated a stop 162 carried on the plunger so as to limit outward movement of the plate 148 and thus prevent accidental disengagement of the plates from the plunger.

Symmetrically disposed about the outer periphery of mandrel 136 are a plurality of pocket-forming dies 163 which are adapted to effect formation of the pyramidic pockets 54 formed at the corners of the container 50 during fabrication thereof (see FIG. 20). Each pocket-forming die 163 includes an elongated vertically extending shaft 164 which is adapted to pass through a bearing 165 affixed to mandrel 136. The upper end of shaft 164 terminates in an enlarged head 167 (see FIG. 9). Encompassing a portion of shaft 164 is a coil spring 168 which has the upper end thereof engaging head 167 and the lower end thereof engaging a collar formed in bearing 165. The lower end 170 of die 163 extends below bearing 165 and is tapered in a manner as shown, so as to form pyramidic pocket 54.

Figure 3:
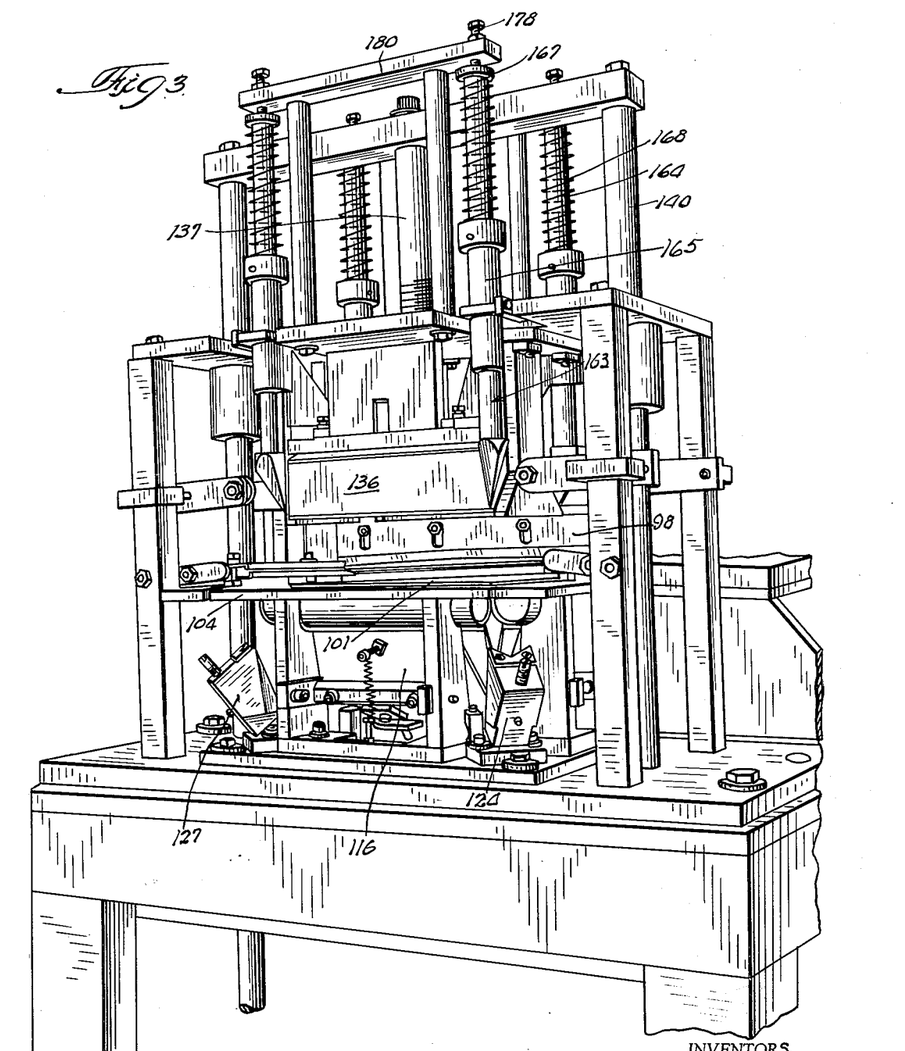
FIG. 3 is an enlarged fragmentary perspective right end view of the apparatus shown in FIG. 1 and with the details of the forming dies emphasized.

To effect unitary movement of dies 163 with mandrel 136, there is provided at each bearing 165 a slot 165a in which is disposed a release key 171 (see FIGS. 9 and 24), of substantially U-shaped configuration. When the key is in locking engagement with shaft 164, as shown in full lines in FIG. 24, the key is seated within a groove 172 formed in shaft 164. A coil spring 173 is provided for biasing the key 171 into locking engagement and thereby cause shaft 164 to move as a unit with bearing 165. Bearing 165 is provided with a pocket 174 in which is disposed one end of spring 173. The opposite end of spring 173 contacts a follower 175 which bridges the distance between the leg segments of the U-shaped key 171. As the shaft 164 and bearing 165 move downwardly as a unit by reason of yoke 138, follower 175 is caused to engage a roller 176 which is affixed to one end of a stationary arm 177. When this condition occurs, key 171 is cammed out of locking engagement with the shaft 164 to the position shown in dotted lines in FIG. 24, whereupon shaft 164 is free to move upwardly, by reason of spring 168, to the position shown in FIG. 3. Upon upward movement of shaft 164, the tapered end 170 of the die 163 is withdrawn from pocket 54; this withdrawal occurs just prior to the corner-forming blocks 124–127 being actuated to their upright position so as to effect collapsing of the pockets in a manner as shown in FIG. 21. To limit the upward movement of shaft 164 when released by key 171, an adjustable stop 178 is provided on a stationary cross-arm 180, affixed to the frame 57.

Once the pocket-forming dies 163 have moved upwardly clear of the corner-forming blocks 124–127, and the cam 71 has actuated the mandrel 136 upwardly from its lower terminal position, the coil springs 113 will automatically raise the platform 110 on which the container 50 is disposed, up to a position flush with the upper surface of platform 104. While the container is being moved to this position, the pairs of rollers 106 and 107 cause the marginal edge portions 55 of the container to be folded flat over portions of the outer surface of side sections 52a and 52b and collapsed pocket sections 54a and 54b and press the collapsed pocket sections 54a and 54b against side sections 52a and 52b, respectively. Once the container is in the position as shown in FIG. 6, it may be automatically removed from the apparatus onto a conveyor or the like, not shown. The automatic removal of the container 50 from the position shown in FIG. 6 is effected by the successive blank 101 being fed into position on base 104 of the forming mechanism 66.

Process for Forming Container

Figure 4:
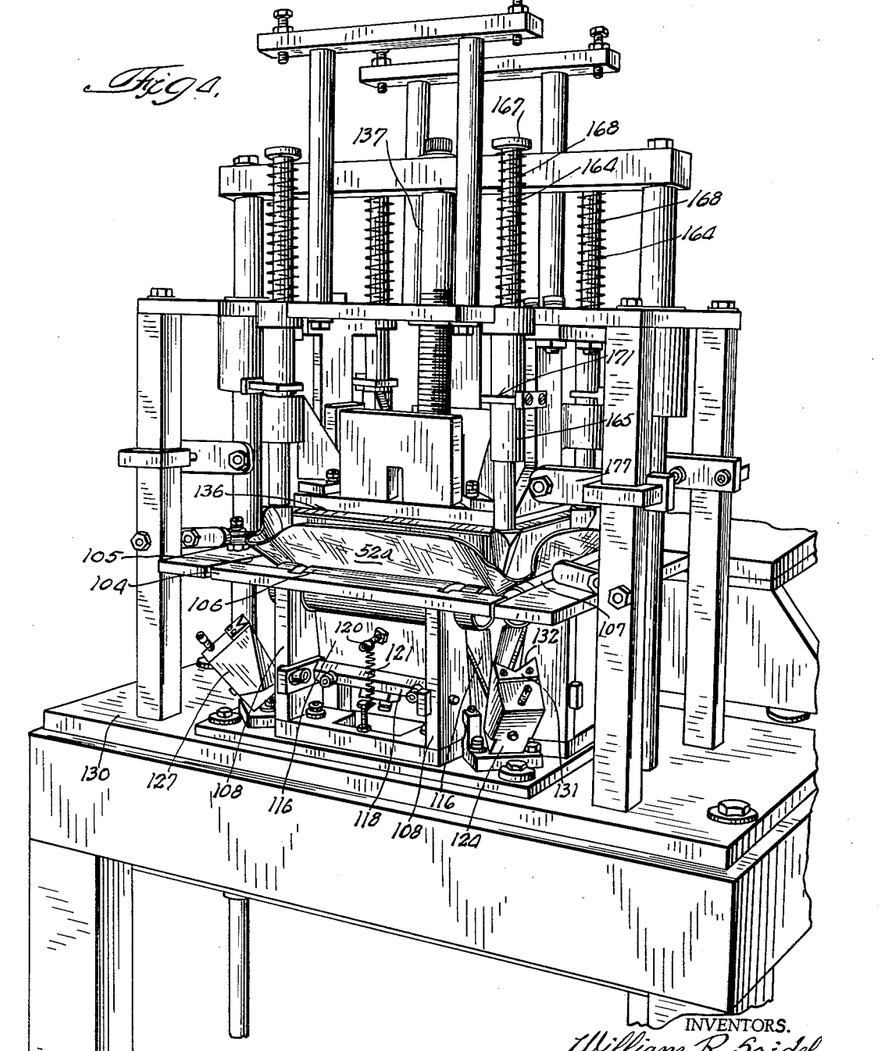
FIG. 4 is simliar to FIG. 3, but showing the mandrel in a position of partially extending into the forming pocket during commencement of the formation of the container.

By way of summarizing, the process of forming the container 50 from a web of metallic sheet material 61, comprises first, notching the elongated side edges of the web by the sets of notching dies 86 and 87 disposed on the upper side of frame 57. The notching can occur either before or after the web passes through the web-feeding and indexing mechanism 64, depending upon the form of apparatus utilized. Subsequent to the notching of the side edges, the web is fed past the cutter bar 98 whereby the blank 101 is severed from the web. The blank, upon severance from the web, is in position over the opening 105 formed in base surface 104, whereupon the mandrel 136 is actuated downwardly. The adjacent surfaces of the mandrel 136 and platform 110 are of substantially the same configuration and correspond to the shape of the bottom section 51 of the container to be formed. As the mandrel moves downwardly (see FIGS. 4 and 9), the marginal portions of the blank 101 are brought into partially enfolding engagement with the vertical sides of the mandrel by rollers 106 and 107. Moving with the mandrel 136 during its downward stroke, are dies 163 which cause pyramidic pockets 54 to be formed at the corners of the container simultaneously with the formation of vertical side sections 52a and 52b. Upon the mandrel reaching the bottom of its downward stroke, the pocket-forming dies 163 are automatically retracted, whereupon the corner-forming blocks 124–127 are actuated to an upright position, subsequent to side-forming plates 116 and 117 being actuated to their upright positions, and thus cause simultaneous collapse of the pockets 54 and the formation of like sections 54a and 54b in substantial overlying relation with corresponding portions of the side sections 52a and 52b, respectively. Upon mandrel 136 reaching its lower terminal position, and plates 116 and 117 and blocks 124–127 being actuated to their upright positions, forming plates 148 are then actuated outwardly from the mandrel sides and bend the upper marginal edges 55 of the container side sections 52a and 52b outwardly at substantially a right angle (see FIG. 22). Following outward spreading of plates 148, the mandrel is raised, causing the forming plates 148 to be cammed into a retracted position by the rollers 106 and 107. Upon initial upward movement of the mandrel, the corner-forming blocks and side plates are pivoted out of engagement with the side sections and corners of the container, permitting container 50 to be raised by platform 110, whereupon rollers 106 and 107 fold the marginal edge portions 55 of the container down into overlapping engagement with portions of the collapsed pocket sections 54a and 54b and the remainder of side sections 52a and 52b and thus complete a formation of the container as the platform 110 reaches its upper terminal position.

Thus, it will be seen that an open-top container 50 has been provided which is formed from thin-gauge metallic sheet material and has reinforced corner and an upper marginal edge. Furthermore, the process for forming such a container is expeditious and also is such that it can be practiced by a completely automatic machine.

While the foregoing description has been directed to a container of rectangular configuration, and a process and apparatus for making same, it is to be understood, of course, that the invention is not to be limited thereto, since many modifications may be made, and it is contemplated, therefore, by the appended claims, to cover any such modifications as fall within the true spirit and scope of this invention.

We claim:

1. An apparatus for forming an open-top container from a web of foldable sheet material, said apparatus comprising an upright frame, first means carried on said frame for advancing such web in a given direction, second means carried on said frame and spaced from said first means for severing such web along a line substantially transverse to the direction of advance of such web to form a blank of sheet material, a cavitated surface mounted on said frame adjacent said second means over which such blank is positioned, third means mounted for reciprocatory movement on said frame and in registration with said cavitated surface to effect depression of the central portion of such blank within a cavity in said cavitated surface and form a bottom section of the container, the periphery of said third means cooperating with portions of said surface circumjacent said cavity to effect formation of the marginal portions of such blank into upright side sections cooperating with one another to delimit the bottom section; fourth means mounted on said frame and movable into overlapping relation with the side sections of the depressed blank upon said third means moving into said cavity; fifth means disposed in spaced relation about the periphery of said third means and mounted for reciprocatory movement on said frame and cooperating with said fourth means to effect formation of inverted elongated pockets in the blank disposed outside the periphery of said bottom section and at the junctures formed between adjacent side sections; sixth means mounted on said frame and cooperating with said fifth means for effecting retraction thereof from such pockets while said third means is effecting full depression of such blank central portion; seventh means mounted on said third means and movable therewith, said seventh means being movable independently of said third means in a lateral direction for contacting the upper marginal edges of the pre-formed side sections and folding such marginal edges outwardly, while said third means is in position of fully depressing such blank central portion and said fourth means is in overlapping relation with said formed blank side sections; eighth means mounted on said frame for movement in a direction toward and away from the periphery of said third means, when the latter is in position of fully depressing such blank central portion, said eighth means, when moved in a direction toward said third means periphery, effecting collapse of such pockets whereby like portions of such collapsed pockets are brought into overlapping relation with segments of the side sections juxtaposed the side section junctures, and ninth means mounted on said frame for reciprocatory movement in a direction transverse to the direction of advance of the web for returning the formed container to a position wherein the bottom section is free to slide over said cavitated surface, said ninth means being in aligned relation with said third means; the outwardly folded marginal edges of the side sections contacting the walls of said cavity and being folded downwardly thereby into overlapping relation with the like portions of the collapsed pockets and the remainder of such side sections, upon returning of the container by said ninth means to said position for sliding over said cavitated surface.

2. An apparatus for forming an open-top container from a blank of foldable sheet material, said apparatus comprising an upright frame having a substantially horizontally disposed cavitated surface over which such blank is disposed and in registered relation with a cavity thereof, first means mounted for reciprocatory movement on said frame in a direction substantially normal to said cavitated surface, said first means being aligned with said cavity and, when actuated in one direction of reciprocatory movement, contacting the central portion of the blank and depressing the latter into said cavity and forming the bottom section of the container, the periphery of said first means cooperating with the portions of said surface circumjacent said cavity to form the marginal portions of such blank into upright side sections delimiting the central portion upon depressing of the latter; second means mounted on said frame and movable into overlapping relation with the side sections of the depressed blank upon said third means moving into said cavity; third means mounted for reciprocatory movement on said frame and disposed in spaced relation about the periphery of said first means, said third means, when moving in one direction of reciprocatory movement, extending into said cavity and cooperating with said first and second means to form elongated pockets disposed outside the periphery of the container bottom section and at the junctures formed by adjacent side sections; fourth means mounted on said frame for movement toward and away from the periphery of said first means, when the latter is in a position of fully depressing the blank central portion, and effect collapse of the elongated pockets along their elongated axes whereby like portions of the collapsed pockets overlap the outer surfaces of the side sections juxtaposed the junctures and conform to the configuration of said outer surfaces; fifth means carried by said first means and movable laterally thereof, when said first means is in position of fully depressing the blank central portion and said second means is in overlapping relation with the side sections of the depressed blank, for contacting and folding outwardly the upper marginal edge portions of the side sections, and sixth means movably mounted on said frame and in contact with the formed bottom section of the blank for moving the latter out of the cavity to a position wherein the container is slidable over said cavitated surface; the outwardly bent marginal edge portions of the blank contacting and being folded over into overlapping relation with the like portions of the collapsed pockets and the remainder of the side sections by the walls of said cavity upon movement of the container by said sixth means out of said cavity.

3. An apparatus for forming an open-top container from a blank of foldable sheet material, comprising a horizontally disposed cavitated surface on which such blank is positionable with the central portion of the blank in registration with a cavity in said surface, mandrel means mounted above said surface and in alignment with said cavity and movable into and out of said cavity to effect depression of the blank central portion into said cavity and form a bottom section of the container, the peripheral contour of said mandrel means conforming substantially to the contour of said cavity for forming the marginal portions of such blank into upright side sections of the container with the end limits of such side sections interconnected by elongated upright pockets disposed outside the periphery of the container bottom section, simultaneously with the formation of the container bottom section; plate means adjustably mounted beneath said surface adjacent the cavity formed therein and movable toward said mandrel means, when the latter is depressing the blank, into overlapping relation with the upright side sections of such blank, die means disposed in relatively spaced relation about the periphery of said mandrel means, when the latter is in its fully depressed position and adjacent said plate means, said die means being movable in a direction toward said mandrel means periphery, when said mandrel means is in its fully depressed position, to effect collapsing of each pocket along its elongated axis and forming like portions in overlapping relation with the outer surfaces of the upright side sections, expansion means carried by said mandrel means and expandable laterally thereof, when said mandrel has moved to its fully depressed position, to effect simultaneous contacting and outward folding of the upper marginal edge portions of the container side sections, first means movably mounted within said cavity for effecting discharge of the container from the cavity and, second means disposed about the periphery of said cavity and engaging and folding back the outwardly folded marginal edge portions of the container side sections into overlapping relation with said like portions of the collapsed pockets and the remainder of the side sections as said first means is effecting discharge of the container from the cavity.

4. The apparatus recited in claim 3, wherein said mandrel means includes a first unit having a surface thereof engageable with the central portion of the blank and of polygonal configuration, and a plurality of second units disposed at the peripheral corners of said first unit surface and movable independently of said first unit into and out of said cavity to form the elongated pockets in the blank.

5. The apparatus recited in claim 4, wherein the end of each second unit is of tapered configuration and forms an inverted, substantially pyramidic pocket in the blank with the apex of such pocket terminating at the plane of the container bottom section.

6. A process of forming an open top container from a sheet of foldable sheet material, said process comprising depressing the central portion of said sheet to form a substantially flat bottom section, urging first marginal portions of said sheet contiguous with said central portion against rigid forms whereby said marginal portions define upright side sections, urging other marginal portions of said sheet contiguous with said side sections of said sheet against rigid forms so as to form inverted substantially pyramidic pockets having a rectangularly shaped base portion at the junction of adjacent side sections, collapsing said pockets about said juncture-forming side edges as axes, whereby like portions of two-ply thickness of material of each collapsed pocket are brought into overlapping relation with corresponding segments of the outer surfaces of the adjoining side sections, and outwardly and downwardly folding upper marginal edge portions of said side sections into overlapping, substantially coplanar relation with the like portions of said collapsed pockets and the remainder of said side sections.

7. Apparatus for forming an open-top container from a blank of foldable material, comprising apertured surface means for receiving said blank, movable platform means disposed in the aperture of said surface means, mandrel means adapted to move into and out of said aperture, said mandrel means having a distal surface portion for urging a central portion of said blank against said movable platform means to form a container bottom in the course of mandrel means movement into said surface means aperture, said mandrel means having side portions extending from the periphery of said distal surface portion; inverted pyramidic die means disposed at the corner junctures between said mandrel means side portions, means disposed adjacent the path of the mandrel means movement for urging peripheral portions of said blank contiguous with the portion engaging said mandrel means distal surface portion against said mandrel means side portions and said inverted pyramidic die means so as to form bottom-delimiting container walls and inverted pyramidic pockets at the juncture of said container walls, means for disengaging said pyramidic die means from said mandrel means after formation of said pyramidic pockets and means spaced from the point of disengagement of said inverted pyramidic die means from said mandrel means disposed in the path of said mandrel means movement for inwardly collapsing said inverted pyramidic pockets into overlying relationship with corner portions defined by the container walls.

References Cited in the file of this patent

UNITED STATES PATENTS

| | | |
|---|---|---|
| 2,004,604 | Ford et al. | June 11, 1935 |
| 2,126,774 | Hinkle | Aug. 16, 1938 |
| 2,630,263 | Ringler | Mar. 3, 1953 |
| 2,722,166 | Keller | Nov. 1, 1955 |
| 2,765,714 | Wischusen | Oct. 9, 1956 |
| 2,873,060 | Inman | Feb. 10, 1959 |
| 2,925,758 | Beetz | Feb. 23, 1960 |